United States Patent
Schäfer

(10) Patent No.: US 9,199,792 B2
(45) Date of Patent: Dec. 1, 2015

(54) SORTING AND DISTRIBUTING SYSTEM

(75) Inventor: Gerhard Schäfer, Neunkirchen (DE)

(73) Assignee: SSI SCHAFER NOEL GMBH LAGER—UND SYSTEMTECHNIK, Giebelstadt (DE)

( * ) Notice: Subject to any disclaimer, the term of this patent is extended or adjusted under 35 U.S.C. 154(b) by 1649 days.

(21) Appl. No.: 12/471,060

(22) Filed: May 22, 2009

(65) Prior Publication Data

US 2009/0288996 A1 Nov. 26, 2009

Related U.S. Application Data

(63) Continuation of application No. PCT/EP2007/010116, filed on Nov. 22, 2007.

(30) Foreign Application Priority Data

Nov. 23, 2006 (DE) .......................... 10 2006 057 266

(51) Int. Cl.
*B07B 1/30* (2006.01)
*B65G 1/137* (2006.01)

(52) U.S. Cl.
CPC .......... *B65G 1/1378* (2013.01); *B65G 2209/02* (2013.01); *B65G 2209/04* (2013.01)

(58) Field of Classification Search
USPC .......... 209/583, 630, 922, 923, 584; 700/216, 700/230, 224
See application file for complete search history.

(56) References Cited

U.S. PATENT DOCUMENTS

| | | | |
|---|---|---|---|
| 5,551,822 A | 9/1996 | Pippin et al. | |
| 5,628,613 A | 5/1997 | Tawara | |
| 5,943,841 A * | 8/1999 | Wunscher | 53/154 |
| 5,998,753 A * | 12/1999 | Darchis et al. | 209/584 |
| 7,158,856 B2 * | 1/2007 | Sheehan et al. | 700/216 |
| 7,882,933 B2 * | 2/2011 | Freudelsperger | 186/69 |
| 2006/0229762 A1 * | 10/2006 | Schaefer | 700/216 |

FOREIGN PATENT DOCUMENTS

| | | |
|---|---|---|
| DE | 298 06 960 U1 | 8/1998 |
| EP | 839 113 B1 | 3/2000 |
| WO | WO 2007093383 A1 * | 8/2007 |

* cited by examiner

*Primary Examiner* — Stefanos Karmis
*Assistant Examiner* — Michael E Butler
(74) *Attorney, Agent, or Firm* — McNeely, Hare & War LLP; Kevin J. McNeely

(57) ABSTRACT

A sorting and distributing system (50) for sorting article units in accordance with customers' orders, the system having a high sorting performance and comprising: a rotary sorting conveyor (14), which may be closed, having a conveyor means, wherein the conveyor means is connected to a plurality of receiving devices (16), to which the article units are to be delivered. A plurality of target positions (54) is coupled to the sorting conveyor (14) and can supply articles units to the receiving devices (16) in accordance with a customer's order, wherein the target positions (54) are assigned to customers' orders. At least one filling station (10; 10') manually fills the receiving devices (16) by article units, wherein the filling station (10; 10') includes a plurality of filling buckets (12) each having an opening mechanism (18) at its lower end thereof, in order to allow supply of article units, which are order picked into the filling bucket (12), to the receiving devices (16) in an automated manner.

20 Claims, 4 Drawing Sheets

SORTING AND DISTRIBUTING SYSTEM

RELATED APPLICATIONS

This is a continuation application of the co-pending international application WO 2008/061744 (PCT/EP2007/010116) filed on 22 Nov. 2007 and claiming priority of the German patent application DE 10 2006 057 266.1 filed on 23 Nov. 2006 which are fully incorporated herewith by reference.

TECHNICAL FIELD

The present invention relates to a sorting and distributing system for sorting article units in accordance with customers' orders, the system having a high sorting performance, and particularly to an order-picking system comprising a sorting and distributing system in accordance with the present invention.

BACKGROUND

A sorting and distributing system is to be understood as a technique for sorting (or assigning) article units in accordance with customers' orders at the second stage of order-picking, preferably dedicated to logistic centers having a high order-picking performance. In dependence on the technique and the article size used, sorting performances of up to 2,000 to 40,000 pieces an hour can be achieved. Such sorting and distributing systems are known in the prior art, and are particularly known under the term "sorter". Among other things, the capability of (automatically) identifying the units, for example through bar codes or transponders (RFID), and the capability of conveying the articles are prerequisites for the use of a sorter.

Hereinafter, an article unit is to be understood as a smallest sales units or a smallest packing unit. An article is a (smallest) unit of an assortment of article, distinguishable by number and label. Many times, articles are designated as wares or goods as well.

Primarily, sorters are distinguished according to their principle of function, independent of their performances. Among other things, there are rotating arm sorters, sliding sorters, tilt-tray sorters, pop-up sorters, etc., in order to exemplarily mention only some of them.

Different articles can be fed automatically to different target positions through a sorter. For that purpose, typically a rotary conveyor is provided which communicates with the target positions. A target position is to be understood as a location at which different articles are brought together in accordance with a customer's order for being packed, for example, into a shipping cardboard box. However, for allowing each target position to be fed with the right article, it is required to know, where an article is located on the rotary conveyor.

With a tilt-tray sorter, the sorting good is conveyed by means of gravity into a target chute by tilting transport trays. The tilt trays are mounted on carts which are connected to each other in an articulated manner. Driving of the tilt trays is caused by a rotary conveyor means (e.g. a chain) or by driving carts (e.g. via linear motors). Goods having greater lengths can be sorted by occupying several trays. Tilt-tray sorters allow the sorting of a broad assortment of articles (e.g. luggage) as well. Rotary speeds of about 2.5 m/s and sorting performances of about 15,000 pieces an hour are achieved.

According to the prior art, the filling of such a tilt-tray sorter then typically happens in an automated manner. The sorting conveyor is fed with articles by means of a separate conveyor, wherein the articles are delivered to the sorting conveyor at specific feeding points via the separate conveyor. At the feeding point one recognizes, preferably automatically, for example by reading a bar code, which (type of) article is to be delivered to which tray. Due to this information, a superordinated control can then guide the article to a predetermined target position. As already mentioned above, sorting performance of about 15,000 pieces an hour can be achieved in such a manner.

However, there are economical sectors, such as the retail of costume jewelry, requiring a greater sorting performance. Tasks are known which require a sorting performance of up to 60,000 pieces an hour. This cannot be achieved by means of a completely automated sorter.

Beside completely automated sorter, in the prior art there are sorting and distributing systems known as well, where the sorting conveyor is loaded manually. In this context, articles are manually scanned by operators at the feeding points, and subsequently thrown, for example, into trays of the sorting conveyor. The trays as such have holes in their bottoms for determining from beneath the tray, by means of a light intensity measurement, whether or not an article was given into the tray. If an operator has scanned an article and if it is simultaneously determined that this article has been given into a specific tray, then a superordinated warehouse management computer (WMC) can guide this article to a target position.

Thereby, mistakes occur frequently. On the one hand, it is not always ensured that the throwing-in of an article into a tray is actually detected. The detecting of a thrown-in article is the more difficult the smaller the packing size is. This is particularly critical in the area of the costume jewelry industry, since there the articles are very small.

Since the trays are loaded manually, a speed by which the trays pass the feeding point might not be too high, because otherwise the operator occasionally throws an article accidentally into a tray which is already filled. In this case, the WMC would not recognize that the tray holds another article or holds any article at all. Further, this "mistake" could not be corrected since the sorting conveyor, as a rule, cannot be stopped.

As an alternative to the above-mentioned options for automatically order-picking articles, it is known to cause the operator to walk with an order-picking container through the storage ("man-to-ware" principle) in order to retrieve the individual article types of a customers' order manually from the storage. However, in this manner only a very small sorting performance can be achieved. An order-picking process in accordance with the "man-to-ware" principle cannot be realized with a bigger assortment of articles if the order-picking requirements are high (e.g. 50,000 pieces an hour), since, on the one hand, a lot of space for installing the entire assortment of articles in a storage, through which one can walk, is required, and, on the other hand, a lot of operators (1 person for each order) has to walk through the storage, who block each other ways eventually.

SUMMARY OF THE INVENTION

Therefore, it is an object of the present invention to provide a sorting and distributing system which can be operated at a very high order-picking performance and sorting performance, respectively.

This object is solved by a sorting and distributing system in accordance with the present invention for sorting article units in accordance with customers' orders, the system having a high sorting performance, wherein the system comprises: a rotary sorting conveyor, particularly a closed loop (hereinafter referred to as "closed"), having conveyor means, wherein the conveyor means is connected to a plurality of receiving devices to which article units are to be delivered; a plurality of target positions, each of which is coupled to the sorting conveyor and to which the receiving devices can supply article units in accordance with a customers' order, wherein customers' orders are assigned to the target positions; and at least a filling station for manually filling the receiving devices with article units, wherein the filling station comprises a plurality of filling buckets, each of which includes an opening mechanism at its lower end for allowing to dispense article units, which are order-picked into the filling buckets, to the receiving devices passing by which preferably move constantly and continuously, respectively.

The filling station in accordance with the present invention has several advantages. An operator does no longer need to throw an article directly into a receiving device, such as a tray, but can give the article into a filling bucket beforehand. As soon as an empty tray passes beneath the filling bucket, the filling bucket can be opened and release articles located therein. Thus, the operator does no longer need to decide into which tray an article is to be dispensed. This is decided by a superordinated controlling device (in advance). This results in significantly less stress for the operator, since the operator does not need to find an empty tray from the plurality of passing trays into which the article can be given. Further, in this manner a (subsequent) recognition, whether an article is to be given into the tray, becomes superfluous. The superordinated controlling device knows which article is to be given and which can be given into which tray.

The sorting conveyor can be operated at a significantly higher speed in comparison to the prior art. The operator only needs to concentrate on the "static" filling buckets and no longer on the somehow racing-by trays. There are reports that operators feel sick at high speeds. This physical impairment is excluded with the present invention.

The filling of empty trays happens in an automated manner, although the articles are manually removed beforehand.

Preferably, the filling station comprises a plurality of filling buckets. This is particularly advantageous if several customers' orders are grouped together, which include one and the same article type (batch generation). In this case, articles to be picked are provided at the filling point, for example in a boxwise manner (with one type only), in order to actually serve all of the customers' orders, which comprise this specific type of article, with this specific type of article.

In accordance with a preferred embodiment the lower end of the filling bucket is arranged above the receiving devices such that the receiving devices can receive article units while passing by, if the opening mechanism is operated.

Hence, gravity is used for transferring the article units from the filling bucket to the receiving device.

It is particularly advantageous if the filling buckets are provided with optical displays for indicating to an operator into which filling bucket, particularly which article unit, has to be order-picked.

Then, the operator does not need to take care which the filling bucket has already been filled or which filling bucket is empty, and thus is available for a filling process. Thus, a filling process can be scheduled purposefully in advance as well. Since the operator typically gives article units of the same type into the filling buckets, since customers' orders are processed at this moment which specifically require this type of article (batch), a superordinated controlling device can already schedule in advance which trays of the sorting conveyor, in terms of a pattern, are to be loaded with this type of article. Then, customers' orders could be processed parallely, wherein, for example, other types of article could be given into the trays at other filling stations located upstream. Here, it is advantageous, if all articles of a customers' order are then stored in neighbouring trays of the sorting conveyor, since subsequently the discharching to the target position, which is associated with the respective customer order, can easily occur.

Preferably, each filling bucket comprises a detecting unit, particularly a light barrier or light grid.

By means of a detecting unit, particularly within the filling bucket or in the region of the filling opening, it can be checked whether or when an article is given into a filling bucket. Also, it can be checked, whether a specific article has been given into the right filling bucket by the operator. For example, if an article has been given into the wrong filling bucket, then this can be detected, and there is the possibility to either remove the article from the filling bucket and to put it into the right filling bucket, or the superordinated controlling device is caused to assign the "falsely filled" filling bucket to another tray, contrary to the original plan. As a result, faulty disposals can be corrected subsequently. According to the prior art this was not possible since a falsely disposed article was instantaneously transported away from the operator due to the movement of the sorting conveyor so that there was no option for correction.

In accordance with another advantageous embodiment, a material flow computer is provided which generates and transmits signals.

The material flow computer is one example of the before-mentioned superordinated controlling device. The material flow computer can, in comparison to an operator, decide much faster, into which tray an article is to be given. The material flow computer is also capable of changing the assignment between a tray and an article. It is referred to the above-mentioned example of a faulty filling process.

Further, it is preferred if a storage-container conveyor is additionally provided, which couples each filling station to a container storage.

Storage containers can be retrieved from the container storage via the storage-container conveyor and transported to the filling station. Here, the "ware-to-man" principle is realized. The operator takes as many articles as required for the customers' orders, all of which comprise this specific type of article (batch processing). More order lines, in comparison to the prior art, can be processed by batch generation. Besides that there are less storage movements required, i.e. less storages and retrievals of storage containers for the purpose of processing a picking order. A stored container, for example, is merely retrieved once an hour from the storage, and transported to the filling station, wherein, for example, fifteen articles are removed, instead of transporting the same fifteen times within an hour to the filling point as it would be the case if no batches would be formed. The storage-container conveyor is used for both storing and retrieving storage containers.

Further, it is advantageous if the material flow computer is adapted to cause deliveries of predetermined storage containers to predetermined filling stations at given times or in a given sequence.

The material flow computer is responsible for the right storage container to be provided to the right filling station at the right time. Also, it is responsible for the storage container to be delivered to the filling station in the right sequence. This allows increasing the order-picking performance.

With another advantageous embodiment, each filling station is provided with a display device for displaying a number of article units which are to be removed from the storage container.

In this manner, the operator immediately knows how many articles are to be removed from the storage container. In best case, the operator immediately removes the correct number of articles, wherein it is assumed that the storage containers include articles of one type only, and then give them into the filling buckets, which preferably is indicated by means of illuminated displays at the filling buckets. Particularly, a confirmation switch is provided, which is actuated if the required number of articles has been removed. Then, the next storage container can be delivered, and the processed storage container can be transferred back into the storage. This process is also possible if the operator has not yet distributed the articles to the filling buckets, i.e. if the operator still holds some articles in his hands and is just distributing them. In this case, an additional confirmation button can be provided by which it can be signalled to the superordinated controlling device when all articles of the storage container, which has been already transported away, have been given into the filling bucket. Then, the superordinated controlling device "knows" that now the next type of article is ready for being distributed into the filling buckets, or which article is to be "married" to which tray.

Therefore, it is advantageous, if each filling station has at least one confirmation unit for indicating to the material flow computer, for example, that the picking of articles from the sort container is completed.

Additionally, it is preferred if the filling buckets are integrated into a housing.

In this manner is it avoided that the operator gets to feel sick. The trays of the prior art "racely" pass the operator. However, the operator must simultaneously determine (in a visual manner), which of the trays is still empty in order to put the article, which is just to be processed, into a tray. Since the human sense of balance depends, among other things, heavily on optical impressions, a static picture is advantageous. The view on the passing sorting conveyor is blocked by the housing. The operator does only see "statically" arranged filling buckets. This affects the operator in a relaxing manner. As a result, the operator is less stressed and, therefore, makes less mistakes. Additionally, the operator can work longer at the filling point without signs of fatigue.

With another advantageous embodiment the receiving devices are adapted to the dimensions of the article units.

If the articles, which are to be put into the trays of the sorting conveyor, are very small, as it is typical, for example, in the area of retail of costume jewelry, the receiving trays can be made smaller in a corresponding manner as well. Since the articles are given into the trays in an automated manner—and do not have to be thrown-in by the operator any more—it is not required to provide relatively large trays for forming the hit area sufficiently large. "Missing" is excluded. Therefore, in systems where, for example, small parts are picked, two rows of trays can be replaced by a plurality of smaller rows of trays, thereby allowing, in turn, increase of the order-picking performance as well as the sorting performance.

Preferably, the receiving devices are trays, which particularly are arranged in a longitudinal direction of the conveyor means in two oppositely arranged rows on the conveyor means.

Also, it is advantageous, if the conveyor means is operated permanently with a speed of more than 1 m/s.

Even speeds are possibly which are higher or identical to such speeds as applied with the completely automated sorting conveyor mentioned at the outset. The reasons is that the throw-in into the tray is controlled, for example, by a microprocessor (PLC), and no longer by a human.

BRIEF DESCRIPTION OF THE DRAWINGS

It is clear that the features mentioned above and still to be explained in the following cannot only be used in the respectively presented combination but also in other combinations or alone, without departing from the scope of the present invention.

Embodiments of the invention are shown in the figures and will be described in the following description in more detail.

PREFERRED EMBODIMENTS OF THE INVENTION

Figure 1:
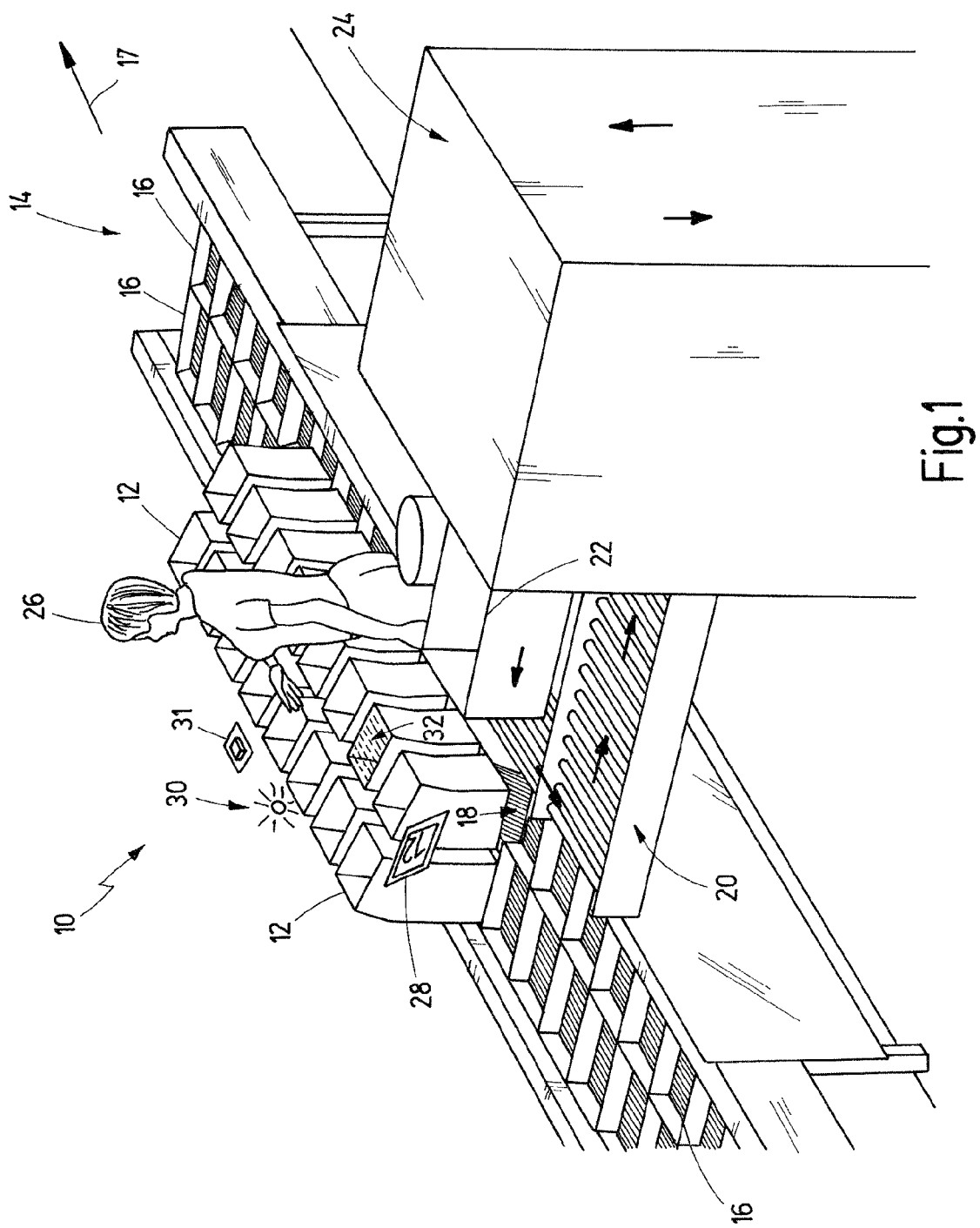
FIG. 1 shows an isometric view on a filling station in accordance with the present invention.

In the following description same elements will be designated by reference numerals. A filling station is designated by the reference numeral 10.

FIG. 1 shows a perspective view on a filling station 10.

The filling station 10 comprises at least one filling bucket 12. FIG. 1 shows sixteen filling buckets 12 which are arranged in two rows, each having eight filling buckets. The filling buckets are arranged above a sorting conveyor 14. The sorting conveyor 14 can be implemented, for example, by a tilt-tray sorter having two rows of trays 16. However, other types of receiving devices can be used as well, as described exemplarily at the introductory part of the present document in the context of the different types of sorters. The trays 16, which are arranged in two rows, are moved along an arrow 17 beneath the filling buckets 12.

The two rows of filling buckets 12 are preferably arranged so that they are located directly above the two rows of trays 16. It is clear that more rows of trays 16 can be used. The size of the trays 16 particularly depends on the size of the articles which are to be picked. If the number of rows of trays is changed, it is recommended to change the number of rows of filling buckets 12 in a corresponding manner as well.

A cross-sectional area of the buckets 12 is adapted preferably to a receiving area of the trays 16. In an ideal case, both areas have almost the same size.

An opening mechanism 18 is provided at a lower end of the filling buckets 12, by which the filling bucket 12 can be opened downwardly, i.e. towards the trays 16. Here, it is exemplarily referred to a bottom which can be folded laterally. However, other mechanism can be used as well, such as an iris diaphragm or similar.

Further, the filling station 10 comprises another conveyor 20 which allows to transport storage containers 22 from and to the filling station 10. FIG. 1 shows a storage-container conveyor track 20 in terms of a roller track. It is clear that other types of conveyor tracks can be employed as well, such as belts or the like.

Storage containers 22 are transported from a container storage, which is not depicted here, via, for example, a lift 24 to the filling station 10, preferably within a range of the arms of an operator 26, by means of the roller track 20. A transport path of the containers is depicted in FIG. 1 exemplarily by black arrows. In the example of FIG. 1, the container storage (which is not depicted) is located beneath the filling station 10, which is the reason why the lift 24 is used for feeding storage containers 22.

As soon as the storage container 22 arrives at the filling station 10, it is indicated to the operator 26 via a display 28 how many article units are to be removed from the currently delivered storage container 22. In the exemplary situation of FIG. 1, twelve article units are to be picked. Then, the operator 26 removes the corresponding number of article units 26 from the storage container 22, and delivers them from above into openings of the filling buckets 12. Empty filling buckets 12 can be indicated by means of, for example, green lamps. FIG. 1 exemplarily shows a display element 30. It is clear that each filling bucket 12 can be assigned to at least one lamp 30. Each bucket 12 could be assigned, for example, a green lamp and a red lamp, wherein the color of green signals that articles can be given into this filling bucket 12, and wherein the color of red signals that any article can be given into this filling bucket 12.

If the operator 26 has removed the twelve articles from the storage container 22, this can be signalled to a superordinated controlling device, which is not depicted here, by actuating an acknowledgement button 31. Here, the acknowledgement button 31 is arranged exemplarily above the two rows of filling buckets 12. It is clear that the acknowledgement button 31 can be implemented, for example, as a foot bottom as well, onto which the operator 26 steps in case of an acknowledgement.

Further, it is possible that the acknowledgement button 31 is actuated for a first time, if all articles, which are to be removed from the storage container 22, have been removed so that the transport of the storage containers 22 can be initiated, and a delivery transport of new storage containers 22 can be caused. In the meantime, the operator 26 can give the remaining articles into empty filling buckets 12. In an ideal case, the next storage container 22 is already provided which then contains another type of article needed for processing a customers' order.

The dropping of the articles into the filling buckets 12 as such can be monitored by means of a light grid. It is clear that other detection devices can be employed as well, such as a simple light barrier for detecting the event of a throw-in.

By means of the light grid 32 it can be checked whether the operator 26 has actually given the article into a filling bucket 12 which is either free or provided for this purpose. If the operator throws the article accidentally, for example, into a filling bucket 12 being already occupied, which, for example, is illuminated red, the red lamp could signal the occurrence of a false order-picking process by flashing. The operator 26 thus would have the possibility to reach into the filling bucket 12 and transfer the falsely thrown-in article into a free (green) filling bucket 12. Then, the signal of the light grid 32 can also be used for preventing the opening of the bottom of the filling bucket 12. As long as the operator 26 reaches into the filling bucket 12, this is detected by the light grid 32. A corresponding signal is delivered to the superordinated controlling device, which in turn prevents the opening of this filling bucket 12. In such a case, the correction of the mistake could be confirmed, for example, by actuating the acknowledgement button 31 so that the superordinated controlling device knows that the normal course can be continued then.

As soon as the operator 26 has given all articles of the first storage container 22 into the filling buckets 12, this can be signalled to the superordinated controlling device by actuating the acknowledgement button 31 once again. Optionally, further acknowledgement buttons can be provided, which, however, are not depicted in FIG. 1. For example, an acknowledgement button for the delivery and removal of storage containers 22, an acknowledgement button for confirming removal of a mistake as well as an acknowledgement button for confirming the throw-in of all articles could be provided.

Experiments have shown that it is much more convenient for the operator 26 to give articles into the static filling buckets 12, instead of having to throw them into the trays 16 racing-by. The trays 16 are operated at speeds which are identical or even higher than speeds used in fully automated systems. Typical speeds of conventional fully automated sorters are about 2.5 m/s.

The filling station 10 of FIG. 1 further distinguishes in an ergonomic manner. The filling buckets 12 as well as the delivery location of the storage containers 22 is preferably located within the range of the operator's 26 arms so that the operator almost does not need to walk in order to throw articles into the filling buckets 12. The operator 26 can work both in a standing and sitting manner.

Figure 2:
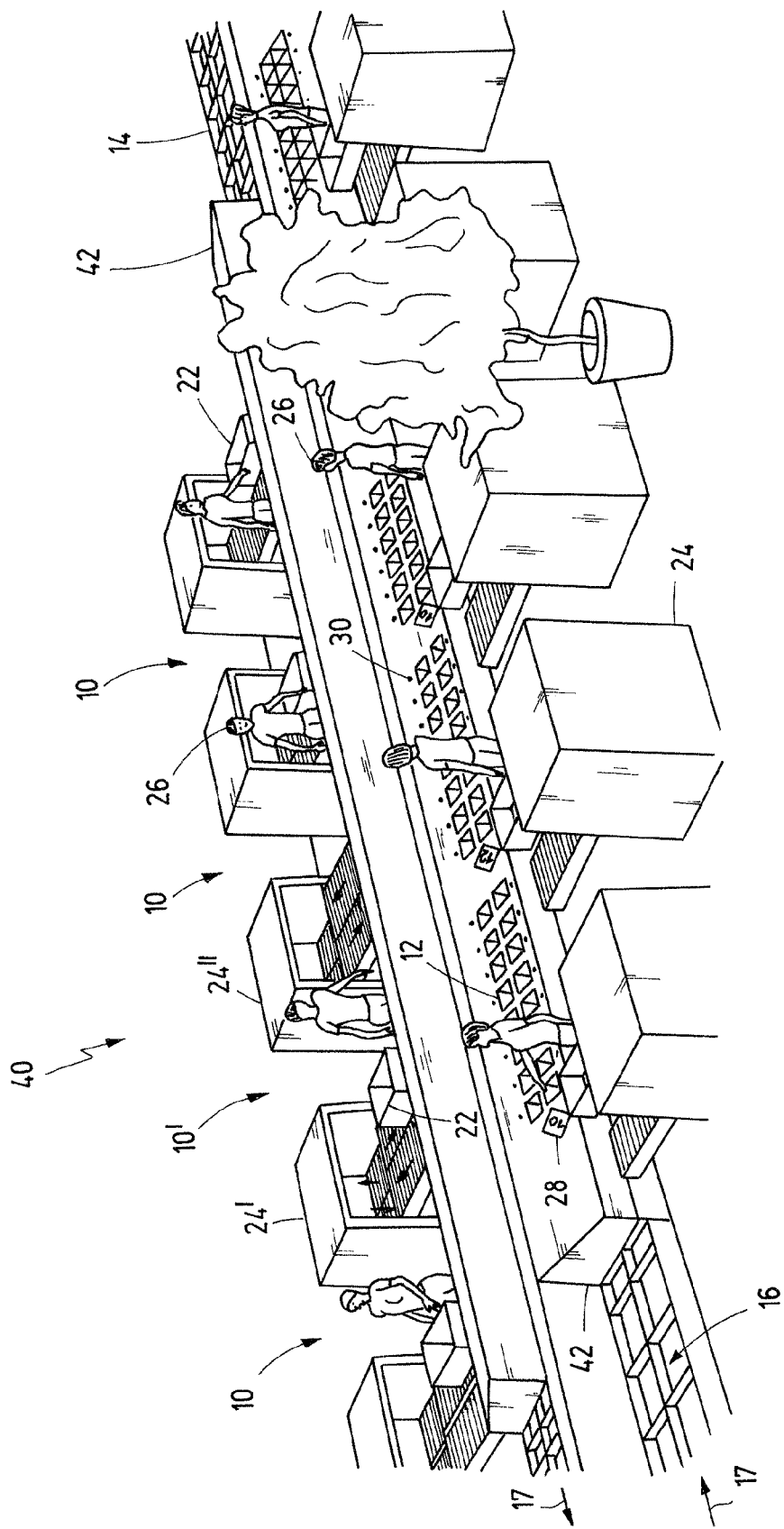
FIG. 2 shows an isometric view on a group of filling stations in a sorting and distributing system in accordance with the present invention.

With reference to FIG. 2 a group 40 of filling stations 10 is depicted.

The sorting conveyor 14 can be realized in terms of an endlessly rotating conveyor loop, so that the trays 16 first pass the filling points 10 being located in the front of FIG. 2, in order to subsequently pass the filling points 10 being located in the rear part of FIG. 2.

The arrangement of FIG. 2 shows that customers' orders can be processed in parallel. While a first operator 26 at a first filling station 10 gives articles of a first type into the buckets 12, a second operator 26 at a second filling station 10 can give articles of a second type into the buckets 12. Similar is true for the third and each further filling station. In this manner, many different types of articles can be transferred into the filling buckets 12 and to the sorting conveyor 14, whereby the articles belong to one and the same customer's order.

Preferably, each customers' order is assigned to a group of (particularly joint) trays 16. As soon as this group of trays 16 passes the first filling station 10, the bottoms 18 depicted in FIG. 1 are opened and release the article or articles being stored in the filling bucket 12. Since the conveyor 14 is constantly moving, the group of trays 16 reaches almost immediately the second filling station 10 where articles of another type can be given into the same tray 16 or another tray 16. The same applies with respect to any other filling station 10 being located upstream with respect to the transportation direction of the conveyor 14.

Now, in FIG. 2 shows a housing 42 as well, into which the filling buckets 12 can be integrated. The housing 42 has the function of keeping the trays 16, which are passing-by, out of the field of sight of the operator 26. The operator 26 merely sees the "static" filling buckets 12, but not the trays 16 racing-by. Thus, the operator 26 can work completely relaxed. This is also based on the fact that the operator 26 does not need to choose a free tray into which the articles can be thrown. This is controlled by the superordinated controlling device. The controlling device decides which bucket 12 must be opened at which time.

Changing position of the operator 26, as typically performed according to the prior art, is neither required anymore. In the prior art, the operators 26 have changed position since the operator 26 working at the streamlowermost position had the least free trays 16 at disposal in order to still throw-in articles, since the operators 26 working streamupwards eventually had already occupied almost all of the empty tray 16 with articles.

Further, in the upper row of filling stations 10 of FIG. 2 a particular filling station 10' is shown. In this context, the second operator 26, as seen from the left, is concerned. The filling station 10' distinguishes in that two lifts 24' and 24" take care of the supply of storage containers 22. In the example of FIG. 2 a situation is depicted where the right-hand lift 24" is just delivering a new storage container, while the left-hand lift 24 provides a storage container 22 for picking purposes. The delivery periods of storage containers 22 can thus be reduced significantly.

Alternatively, two lifts 24 can be served by only one operator 26. This is particularly advantageous if one of the operators 26 needs a break in order to relax. The articles, which are delivered via the lift 24 being assigned to this operator, then can be filled into the buckets 12 by a neighbouring operator 26 (for a short-term period), so that a customers' order can be processed even during the break. This increases the flexibility of the entire system.

Figure 3:
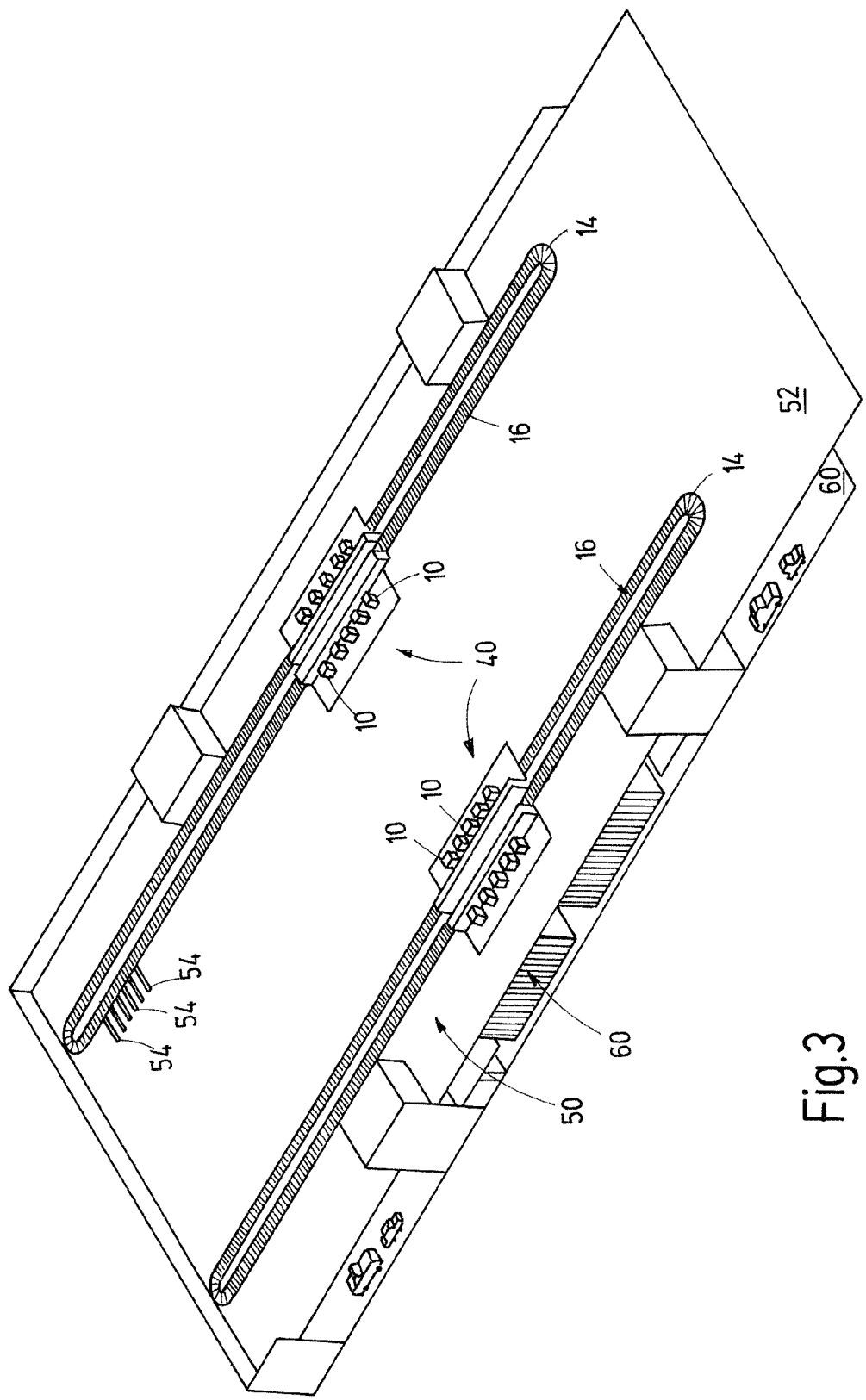
FIG. 3 shows an isometric view on a part of an order-picking system in accordance with the present invention, as depicted in more detail in FIG. 4.

With reference to FIG. 3 a perspective view on a part of an order-picking system is shown which will be described in more detail with reference to FIG. 4.

Similarly to FIG. 2, groups 40 of filling stations 10 are shown here. Further, respectively one sorting conveyor 14 having a plurality of trays 16 is shown in a rotary and closed manner. These two groups 40 together with their respective sorting conveyor 14 exemplarily build a sorting and distributing system 50 in accordance with the present invention. Here, the sorting and distributing system 50 is depicted at a first floor 52 of a building. It is clear that the system 50 can be realized with more or less sorting conveyors 14 and filling stations 10. The system 50 comprises at least one sorting conveyor 14 as well as one filling station 10 having at least one filling bucket 12. The system 50 is scalable, i.e. additional filling stations 10 or filling buckets 12 can be added at any time. The sorting conveyor 14 can be extended arbitrarily, particularly if additional target positions 54 are needed, wherein FIG. 3 exemplarily shows 5 pieces thereof in total.

The sorting and distributing system 50 shown in FIG. 3 comprises, for example, 500 target positions 54 for each sorting conveyor loop 14. This means that 500 customers' orders can be processed simultaneously for each loop.

A storage system 60 for order picking is here exemplarily arranged at a ground floor 60. The storage system 60 is preferably arranged directly beneath the groups 40 in order to keep the ways of the containers from the storage 60 to the filling stations 10 as short as possible. So-called storage carrousels can be used in the storages 60 for the purpose of storing storage containers. The transport between the storage 60 and the filling stations 10 preferably happens through a suitable conveyor, which is not illustrated in FIG. 3.

Figure 4:
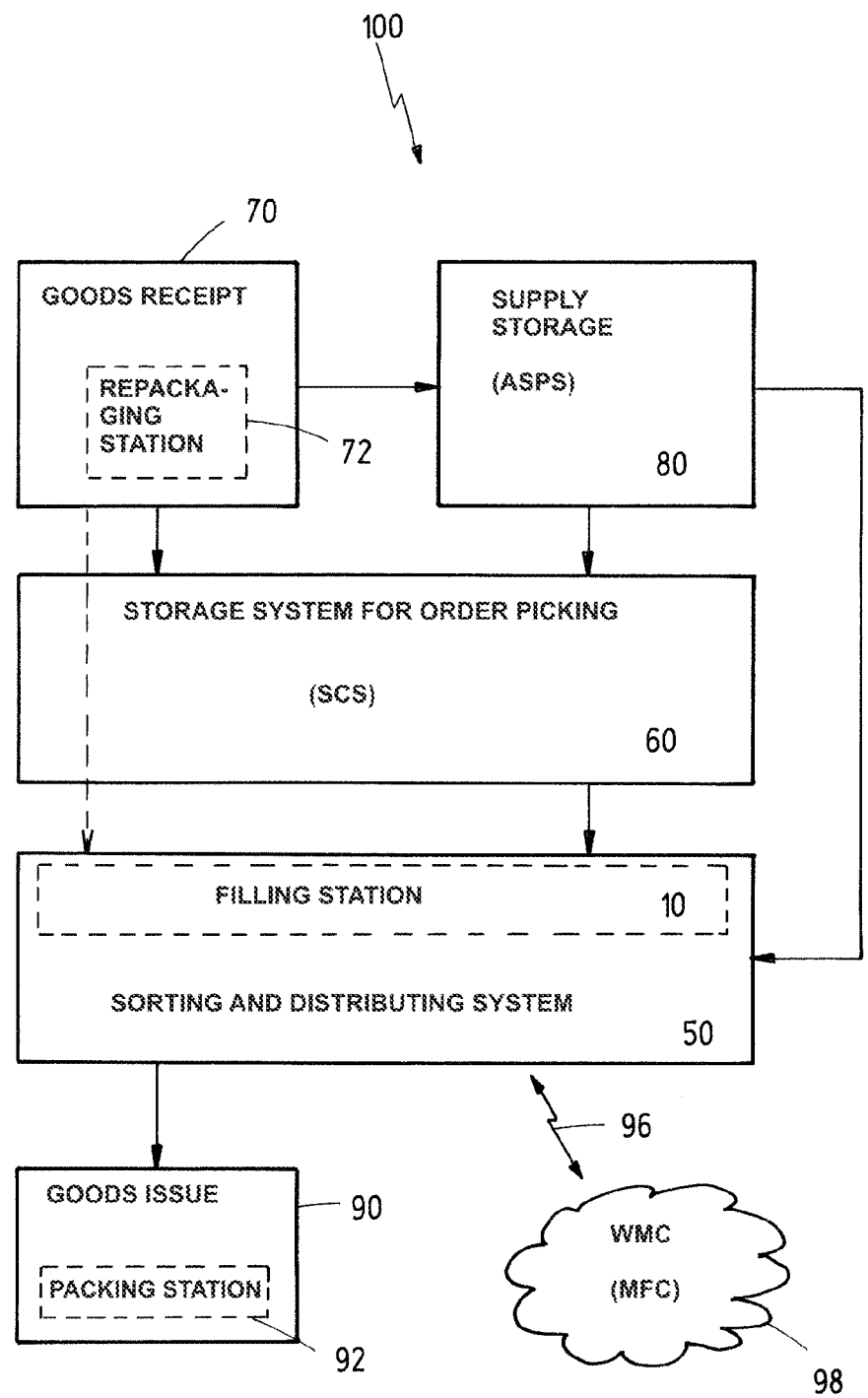
FIG. 4 shows a block diagram of an order-picking system of the present invention.

With reference to FIG. 4, a block diagram of an order-picking system 100 in accordance with the present invention is shown.

The order-picking system particularly comprises a goods receipt 70 having repackaging stations 72, if necessary, a supply storage 80, a storage system for order-picking 60, a sorting and distributing system 50 including filling stations 10 as well as a goods issue 90 preferably having packing stations 92. The movement of the articles is controlled and regulated by a warehouse management computer (WMC) or a material flow computer (MFC) 98.

The supply storage 80 can be implemented by a so-called automated small part storage (ASPS), wherein storage containers 22 can be stored, for example, double deep. If the delivery of articles at the goods receipt 70 happens, for example, on pallets, these pallets can be repacked from the pallet into storage containers at repackaging stations 72. It is clear that appropriate conveyors can be provided between the individual blocks of FIG. 4 for ensuring the material flow and article flow.

As already mentioned in the context of FIG. 3, a storage system 60 for the purpose of order-picking can be provided between the supply storage 80 and the sorting and distributing system 50, particularly in terms of a carrousel storage. The carrousel storage provides the required performance, in order to supply a plurality of filling stations 10 with storage containers 22. In accordance with the present invention, the supply storage 80 can be equipped, for example, with 10 aisles so that about 160,000 storage spaces (with the double deep embodiment) are available. These 10 aisles are served by 10 storage and retrieval machines (which are not shown). The carrousel storage 60 comprises about 30,000 container spaces. The performance of the carrousel storage is about 6,000 containers an hour which can be stored and retrieved. The sorting conveyor 14 allows about 29,000 trays each hour to pass the filling stations 10. This means, if three instead of two, as shown in FIG. 3, sorting conveyors 14 are provided, an entire performance of about 87,000 trays is achieved which can be filled each hour. This represents an enormous performance which cannot be achieved with any sorting and distributing system in accordance with the prior art.

Therefore, I claim:

1. A sorting and distributing system to sort article units in accordance with customers' orders, the system having a high sorting performance and comprising:
    a rotary sorting conveyor having a conveying means wherein the conveying means is connected to a plurality of receiving devices to which the article units are to be delivered;
    a plurality of target positions each of which is coupled to the sorting conveyor and to which the receiving devices can deliver article units in accordance with a customer's order, wherein the target positions are assigned to the customers' orders; and
    at least one filling station to manually fill article units into the receiving devices, wherein the filling station comprises a plurality of filling buckets, each of which comprises an opening mechanism at a lower end thereof, in order to deliver article units, which are picked into the filling bucket, to the receiving devices in an automated manner.

2. The system of claim 1, wherein the receiving devices pass-by continuously with a constant speed.

3. The system of claim 1, wherein the lower end of the filling bucket is arranged above the receiving devices to allow reception of the article units, if the opening mechanism is actuated, while the receiving devices pass-by.

4. The system of claim 1, wherein the filling bucket includes an optical display to indicate to an operator into which of the filling buckets an article unit is to be order-picked.

5. The system of claim 4, wherein the optical display further indicates which article unit is to be order-picked.

6. The system of claim 1, wherein each filling bucket comprises a detection unit to detect an order-picking process of an article unit into the filling bucket.

7. The system of claim 6, wherein the detection unit is one of a light barrier and a light grid.

8. The system of claim 1, further comprising:
    a material flow computer to generate and transmit signals in order to deliver article units, which are order-picked into the filling buckets, to free receiving devices, and to subsequently guide the article units within the receiving devices to predetermined target positions.

9. The system of claim 8, wherein the material flow computer is adapted to cause deliveries of predetermined storage containers to predetermined filling stations at given times.

10. The system of claim 8, wherein the material flow computer is adapted to cause deliveries of predetermined storage containers to predetermined filling stations according to a given sequence.

11. The system of claim 1, further comprising:
a storage container-conveyor coupling each filling station to a container storage, in order to supply storage containers containing predetermined article units to the filling station, and, if necessary, store the storage containers back into the container storage after an order-picking process into the filling buckets has happened.

12. The system of the claim 1, wherein each filling station comprises an acknowledgement button in order to be able to signal to a material flow computer that an article removal from a storage container is completed.

13. The system of any of the claim 1, wherein each filling station is assigned to a display device, in order to indicate a number of article units which are to be retrieved from the storage containers.

14. The system claim 1, wherein the filling buckets are integrated into a housing, in order to prevent Operators from seeing the receiving devices which are moving off beneath the filling buckets.

15. The system of claim 1, wherein the receiving devices are dimensioned such that small parts can be received.

16. The system of claim 1, wherein the receiving devices are trays.

17. The system of claim 1, wherein the receiving trays are arranged in a longitudinal direction of the conveying means in two oppositely arranged rows on the conveying means.

18. The system of claim 1, wherein the conveying means is operated permanently with a speed of more than 1 mls.

19. The system of claim 1, wherein the rotary sorting conveyor is a closed loop.

20. An order-picking system comprising:
a sorting and distributing system including a rotary sorting conveyor, which is a closed loop, having a conveying means wherein the conveying means is connected to a plurality of receiving devices to which the article units are to be delivered, a plurality of target positions each of which is coupled to the sorting conveyor and to which the receiving devices can deliver article units in accordance with a customer's order, wherein the target positions are assigned to customers' orders, and at least one filling station to manually fill article units into the receiving devices, wherein the filling station comprises a plurality of filling buckets, each of which comprises an opening mechanism at a lower end thereof, in order to deliver article units, which are picked into the filling bucket, to the receiving devices in an automated manner;
a goods receipt;
a supply storage;
a storage system dedicated to the sorting and distributing system; and
a goods issue.

* * * * *